United States Patent
Yu et al.

(10) Patent No.: US 11,613,231 B1
(45) Date of Patent: Mar. 28, 2023

(54) SYSTEM AND METHOD OF UNLOCKING A VEHICLE BASED ON VISUAL DOMAIN DATA AND WIRELESS DOMAIN DATA

(71) Applicant: GM Global Technology Operations LLC, Detroit, MI (US)

(72) Inventors: Bo Yu, Troy, MI (US); Prachi Joshi, Sterling Heights, MI (US); Fan Bai, Ann Arbor, MI (US); Madhu Max Seenisamy, Birmingham, MI (US); Ramesh Ramiah, Troy, MI (US); Kamran Ali, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/556,082

(22) Filed: Dec. 20, 2021

(51) Int. Cl.
| | |
|---|---|
| *B60R 25/25* | (2013.01) |
| *G06V 20/59* | (2022.01) |
| *G06V 40/16* | (2022.01) |
| *G06V 10/98* | (2022.01) |
| *B60R 25/24* | (2013.01) |
| *B60R 25/30* | (2013.01) |
| *B60R 25/20* | (2013.01) |
| *G06V 20/56* | (2022.01) |
| *H04N 23/90* | (2023.01) |

(52) U.S. Cl.
CPC .......... *B60R 25/25* (2013.01); *B60R 25/2081* (2013.01); *B60R 25/245* (2013.01); *B60R 25/305* (2013.01); *G06V 10/993* (2022.01); *G06V 20/56* (2022.01); *G06V 20/59* (2022.01); *G06V 40/172* (2022.01); *H04N 23/90* (2023.01); *B60R 2325/205* (2013.01)

(58) Field of Classification Search
CPC ... B60R 25/25; B60R 25/2081; B60R 25/245; B60R 25/305; B60R 2325/205; G06V 20/59; G06V 40/172; G06V 10/993; G06V 20/56; H04N 23/90
See application file for complete search history.

(56) References Cited

U.S. PATENT DOCUMENTS

| | | | |
|---|---|---|---|
| 2019/0053154 A1* | 2/2019 | Song | H04W 4/90 |
| 2019/0103027 A1* | 4/2019 | Wheeler | G05D 1/021 |
| 2019/0227539 A1* | 7/2019 | Golgiri | G01C 21/12 |
| 2020/0217947 A1* | 7/2020 | Stitt | G07C 9/00309 |
| 2020/0384949 A1* | 12/2020 | Krauss | B60R 25/01 |
| 2022/0237965 A1* | 7/2022 | Vaccariello | G01S 5/0284 |

* cited by examiner

*Primary Examiner* — Thomas D Alunkal
(74) *Attorney, Agent, or Firm* — Vivacqua Crane PLLC (57) ABSTRACT

A method of unlocking a vehicle of a user having a handheld device based on visual domain and radio frequency (RF) domain technologies is provided. The method comprises activating an on-board apparatus of the vehicle when the handheld device of the user is within a threshold distance from the vehicle. The method further comprises comparing a visual domain position of the user based on visual domain data with an RF domain position of the user based on RF domain data by a first equation, $|d_{visual}^{t_i}(X) - d_{RF}^{t_i}(X)| < \varepsilon_d$ and a second equation, $|\varphi_{visual}^{t_i}(X) - \varphi_{RF}^{t_i}(X)| < \varepsilon_\varphi$. The method further comprises validating the user when the first and second equations are true and unlocking the vehicle after the user is validated.

20 Claims, 2 Drawing Sheets

SYSTEM AND METHOD OF UNLOCKING A VEHICLE BASED ON VISUAL DOMAIN DATA AND WIRELESS DOMAIN DATA

INTRODUCTION

The present disclosure relates to remotely unlocking vehicles and, more particularly, to systems and methods of unlocking a vehicle based on visual domain data and wireless domain data.

Current systems and methods of unlocking a vehicle are adequate. However, one challenge is to more easily detect a user of a vehicle when the user approaches the vehicle. Another challenge is to more securely validate a user identity with a vehicle associated with the user.

SUMMARY

Thus, while current systems and methods of unlocking a vehicle achieve their intended purpose, there is a need for a new system and method to more easily detect a user and more securely validate the user to unlock a vehicle remotely.

In accordance with one aspect of the present disclosure, a method of unlocking a vehicle of a user having a handheld device based on visual domain and radio frequency (RF) domain technologies is provided. The method comprises activating an on-board apparatus of the vehicle when the handheld device of the user is within a threshold distance from the vehicle. In this aspect, the method further comprises comparing a visual domain position of the user based on visual domain data with an RF domain position of the user based on RF domain data by a first equation, $|d_{visual}^{t_i}(X) - d_{RF}^{t_i}(X)| < \varepsilon_d$, and a second equation, $|\varphi_{visual}^{t_i}(X) - \varphi_{RF}^{t_i}(X)| < \varepsilon_\varphi$.

In this aspect, $d_{visual}^{t_i}(X)$ is a radial distance of the user from the vehicle relative to a coordinate system of the vehicle based on visual domain data, $d_{RF}^{t_i}(X)$ is a radial distance of the user from the vehicle relative to RF domain data, $\varphi_{visual}^{t_i}(X)$ is a first azimuthal angle calculated from visual domain data, $\varphi_{RF}^{t_i}(X)$ is a second azimuthal angle calculated from wireless domain data, $\varepsilon_d$ is a distance consistency threshold to validate the distance consistency of the visual domain data and the RF domain data, and $\varepsilon_\theta$ is an angle consistency threshold to validate the angle consistency of the visual domain data and the RF domain data.

Moreover, the method further comprises validating the user when the first and second equations are true and unlocking the vehicle after the user is validated.

In accordance with one example, the step of activating comprises monitoring a location of the vehicle and a position of a handheld device of a user based on an intentional detection module. The step of activating further comprises detecting whether the handheld device is within the threshold distance from the vehicle.

In another example, the step of comparing comprises verifying a facial identity of the user based on visual domain data of the user and estimating the visual domain position of the user based on visual domain data of the user. The step of comparing further comprises determining an RF domain position of the vehicle based on RF domain data of the vehicle. In this example, the step of comparing further comprises determining the RF domain position of the user based on RF domain data of the handheld device.

In yet another example, the step of comparing further comprises detecting a non-user having a non-user device based on visual domain data of the non-user and RF domain data of the non-user device to define a visual domain position and an RF domain position of the non-user. The step of comparing further comprises comparing the visual domain position and the RF domain position of the user with the visual domain position and the RF domain position of the non-user by a third equation $|d_{visual}^{t_i}(X) - d_{visual}^{t_i}(Y)| > \vartheta_d$, a fourth equation, $|\varphi_{visual}^{t_i}(X) - \varphi_{visual}^{t_i}(Y)| > \vartheta_\varphi$, a fifth equation $|d_{RF}^{t_i}(X) - d_{RF}^{t_i}(Y)| > \vartheta_d$, and a sixth equation $|\varphi_{RF}^{t_i}(X) - \varphi_{RF}^{t_i}(Y)| > \vartheta_\varphi$.

In this embodiment, $d_{visual}^{t_i}(Y)$ is a radial distance of the non-user to the vehicle relative to the coordinate system of the vehicle based on visual domain data, $d_{RF}^{t_i}(Y)$ is a radial distance of the non-user to the vehicle relative to the coordinate system of the vehicle based on wireless domain data, $\varphi_{visual}^{t_i}(Y)$ is a third azimuthal angle of the non-user to the vehicle relative to the coordinate system based on visual domain data, $\varphi_{RF}^{t_i}(Y)$ is a fourth azimuthal angle of the non-user to the vehicle relative to the coordinate system based on wireless domain data, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle.

In this example, the step of comparing further comprises proceeding to the step of validating the user when the third, fourth, fifth, and sixth equations are true.

In another example, the method further comprises performing a sequence of actions within the vehicle based on personalized settings of the user after unlocking the vehicle.

In yet another example, the method further comprises detecting the facial identity and the visual domain position of the user based on visual domain data of the user when the user is in the vehicle. In this example, the method further comprises verifying the facial identity of the user based on visual domain data of the user when the user is in the vehicle.

In still another example, the method further comprises detecting a companion-user having a companion-user device based on visual domain data of the companion-user and RF domain data of the companion-user device to define a visual domain position and an RF domain position of the companion-user. In this example, the method further comprises performing a sequence of actions within the vehicle based on personalized settings of the companion-user after unlocking the vehicle.

In another example, the step of verifying the facial identity of the user comprises assessing image data quality of the facial identity of the user based on visual domain data of the user and determining a confidence threshold based on the image quality of the facial identity of the user. The step of verifying further comprises processing the visual domain data of the user with a facial recognition module to define a confidence score of the facial identity of the user. Furthermore, the step of verifying comprises confirming the facial identity of the user with an authentication module when the confidence score is greater than the confidence threshold.

In accordance with another aspect of the present disclosure, a system for unlocking a vehicle of a user having a handheld device based on visual domain and radio frequency (RF) domain technologies is provided. The system comprises an onboard apparatus of the vehicle and a cloud server. The onboard apparatus comprises an electronic control unit (ECU) disposed in the vehicle and an external camera. In this aspect, the external camera is disposed on the vehicle and in communication with the ECU. Moreover, the external camera is arranged to detect a facial identity and a visual domain position of the user based on visual domain data of the user.

In this aspect, the onboard apparatus comprises a wireless positioning transmitter disposed on the vehicle and in communication with the ECU. The wireless positioning transmitter is arranged to detect an RF domain position of the vehicle based on RF domain data of the vehicle. Moreover, the wireless positioning transmitter is arranged to detect an RF domain position of the user based on RF domain data of the handheld device.

In this aspect, the cloud server is disposed remote from the vehicle and in communication with the ECU and the handheld device. The cloud server is arranged to compare the visual domain position of the user with the RF domain position of the user by a first equation, $|d_{visual}^{t_i}(X)-d_{RF}^{t_i}(X)|<\varepsilon_d$ and a second equation, $|\varphi_{visual}^{t_i}(X)-\varphi_{RF}^{t_i}(X)|<\varepsilon_\varphi$.

In this aspect, $d_{visual}^{t_i}(X)$ is a radial distance of the user from the vehicle relative to a coordinate system of the vehicle based on visual domain data, $d_{RF}^{t_i}(X)$ is a radial distance of the user from the vehicle based on wireless domain data, $\varphi_{visual}^{t_i}(X)$ is a first azimuthal angle calculated from visual domain data, $\varphi_{RF}^{t_i}(X)$ is second azimuthal angle calculated from wireless domain data, $\varepsilon_d$ is a distance consistency threshold to validate the distance consistency of the visual domain data and the RF domain data, and $\varepsilon_\theta$ is an angle consistency threshold to validate the angle consistency of the visual domain data and the RF domain data, The cloud server is arranged to validate the user when the first and second equations are true. Moreover, the cloud server is arranged to unlock the vehicle when the user is validated. Furthermore, the ECU is arranged to activate the external camera and the wireless positioning transmitter of the vehicle when the handheld device of the user is within a threshold distance from the vehicle In one embodiment, the ECU is arranged to monitor a location of the vehicle. Moreover, the cloud server is arranged to monitor a position of a handheld device of a user based on an intentional detection system. Additionally, the cloud server is arranged to detect whether the handheld device is within the threshold distance from the vehicle.

In another embodiment, the cloud server is arranged to verify the facial identity of the user based on visual domain data of the user. Moreover, the cloud server is arranged to estimate the visual domain position of the user based on visual domain data of the user. Additionally, the cloud server is arranged to determine an RF domain position of the vehicle based on RF domain data of the vehicle. Furthermore, the cloud server is arranged to determine the RF domain position of the user based on RF domain data of the handheld device.

In yet another embodiment, the cloud server is arranged to detect a non-user with a non-user device based on visual domain data of the non-user and RF domain data of the non-user device to define a visual domain position and an RF domain position of the non-user. Moreover, the cloud server is arranged to compare the visual domain position and the RF domain position of the user with the visual domain position and the RF domain position of the non-user by a third equation $|d_{visual}^{t_i}(X)-d_{visual}^{t_i}(Y)|>\vartheta_d$, a fourth equation, $\varphi_{visual}^{t_i}(X)-\varphi_{visual}^{t_i}(Y)|>\vartheta_\varphi$, a fifth equation $|d_{RF}^{t_i}(X)-d_{RF}^{t_i}(Y)|>\vartheta_d$, and a sixth equation $|\varphi_{RF}^{t_i}(X)-\varphi_{RF}^{t_i}(Y)|>\vartheta_\varphi$.

In this embodiment, $d_{visual}^{t_i}(Y)$ is a radial distance of the non-user to the vehicle relative to the coordinate system of the vehicle based on visual domain data, $d_{RF}^{t_i}(Y)$ is a radial distance of the non-user to the vehicle relative to the coordinate system of the vehicle based on wireless domain data, $\varphi_{visual}^{t_i}(Y)$ is a third azimuthal angle of the non-user to the vehicle relative to the coordinate system based on visual domain data, $\varphi_{RF}^{t_i}(Y)$ is a fourth azimuthal angle of the non-user to the vehicle relative to the coordinate system based on wireless domain data, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle. Moreover, the cloud server is arranged to proceed to validating the user when the third, fourth, fifth, and sixth equations are true.

In still another embodiment, the onboard apparatus of the vehicle further comprises an internal camera disposed in the vehicle and in communication with the ECU. Moreover, the internal camera is arranged to detect the facial identity and the visual domain position of the user based on visual domain data of the user when the user is in the vehicle. Additionally, the cloud server is arranged to verify the facial identity of the user based on visual domain data of the user when the user is in the vehicle.

In another embodiment, the cloud server is arrange to perform a sequence of actions within the vehicle based on personalized settings of the user after the vehicle is unlocked.

In yet another embodiment, the onboard apparatus further comprises an internal camera disposed in the vehicle and in communication with the ECU. The internal camera is arranged to detect a companion-user having a companion-user device based on visual domain data of the companion-user and RF domain data of the companion-user device to define a visual domain position and an RF domain position of the companion-user. In this embodiment, the cloud server is arranged to perform a sequence of actions within the vehicle based on personalized settings of the companion-user after unlocking the vehicle.

In accordance with another aspect of the present disclosure, a method of unlocking a vehicle of a user having a handheld device based on visual domain and radio frequency (RF) domain technologies is provided. The method comprises monitoring a location of the vehicle and a position of the handheld device of a user based on an intentional detection system and detecting whether the handheld device is within a threshold distance from the vehicle. In this aspect, the method further comprises activating an on-board apparatus of the vehicle when the handheld device is within the threshold distance from the vehicle and verifying a facial identity of the user based on visual domain data of the user.

In this aspect, the method further comprises estimating a visual domain position of the user based on visual domain data of the user, determining an RF domain position of the vehicle based on RF domain data of the vehicle, and determining an RF domain position of the user based on RF domain data of the handheld device.

Moreover, in this aspect, the method further comprises comparing the visual domain position of the user with the RF domain position of the user by a first comparison, $|d_{visual}^{t_i}(X)-d_{RF}^{t_i}(X)|<\varepsilon_d$ and a second comparison $|\varphi_{visual}^{t_i}(X)-\varphi_{RF}^{t_i}(X)|<\varepsilon_\varphi$. In this aspect, $d_{visual}^{t_i}(X)$ is a radial distance of the user from the vehicle relative to a coordinate system of the vehicle based on visual domain data, $d_{RF}^{t_i}(X)$ is a radial distance of the user from the vehicle relative to a wireless domain data, $\varphi_{visual}^{t_i}(X)$ is a first azimuthal angle calculated from visual domain data, $\varphi_{RF}^{t_i}(X)$ is second azimuthal angles calculated from wireless domain data, $\varepsilon_d$ is a distance consistency threshold to help validate the distance consistency of the visual domain data and the RF domain data, and $\varepsilon_\theta$ is an angle consistency threshold to help validate the angle consistency of the visual domain data and the RF domain data.

Furthermore, the method further comprises validating the user when the first and second comparisons are true and unlocking the vehicle after the user is validated.

In another example of the present disclosure, the step of comparing further comprises detecting a non-user having a non-user device based on visual domain data of the non-user and RF domain data of the non-user device to define a visual domain position and an RF domain position of the non-user. In this example, the step of comparing comprises comparing the visual domain position and the RF domain position of the user with the visual domain position and the RF domain position of the non-user by a third equation $|d_{visual}^{t_i}(X)-d_{visual}^{t_i}(Y)|>\vartheta_d$, a fourth equation $\varphi_{visual}^{t_i}(X)-\varphi_{visual}^{t_i}(Y)|>\vartheta_\varphi$, a fifth equation $|d_{RF}^{t_i}(X)-d_{RF}^{t_i}(Y)|>\vartheta_d$, and a sixth equation $|\varphi_{RF}^{t_i}(X)-\varphi_{RF}^{t_i}(Y)|>\vartheta_\varphi$.

In this embodiment, $d_{visual}^{t_i}(Y)$ is a radial distance of the non-user to the vehicle relative to the coordinate system of the vehicle based on visual domain data, $d_{RF}^{t_i}(Y)$ is a radial distance of the non-user to the vehicle relative to the coordinate system of the vehicle based on wireless domain data, $\varphi_{visual}^{t_i}(Y)$ is a third azimuthal angle of the non-user to the vehicle relative to the coordinate system based on visual domain data, $\varphi_{RF}^{t_i}(Y)$ is a fourth azimuthal angle of the non-user to the vehicle relative to the coordinate system based on wireless domain data, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle.

In this example, the step of comparing further comprises proceeding to the step of validating the user when the third, fourth, fifth, and sixth equations are true.

In another example, the method further comprises performing a sequence of actions within the vehicle based on personalized settings of the user after unlocking the vehicle.

In yet another example, the method further comprises detecting a companion-user having a companion-user device based on visual domain data of the companion-user and RF domain data of the companion-user device to define a visual domain position and an RF domain position of the companion-user. Additionally, the method further comprises performing a sequence of actions within the vehicle based on personalized settings of the companion-user after unlocking the vehicle.

In still another example of the present disclosure, the step of verifying the facial identity of the user comprises assessing image data quality of the facial identity of the user based on visual domain data of the user and determining a confidence threshold based on the image quality of the facial identity of the user. Moreover, the step of verifying comprises processing the visual domain data of the user with a facial recognition module to define a confidence score of the facial identity of the user. Furthermore, the step of verifying comprises confirming the facial identity of the user with an authentication module when the confidence score is greater than the confidence threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Aspects of the present disclosure provide a system and method of securely unlocking a vehicle of a user having a handheld device based on visual domain and wireless (e.g., radio frequency) domain technologies. The system and method more securely and more accurately validates a user of a vehicle when the user is within a threshold distance from the vehicle. The system and method compare visual domain data of the user and wireless domain data of the user's handheld device to more securely validate the user of the vehicle. Upon validation of the user, the system and method unlock the vehicle and activate user personalized settings in the vehicle.

Figure 1:
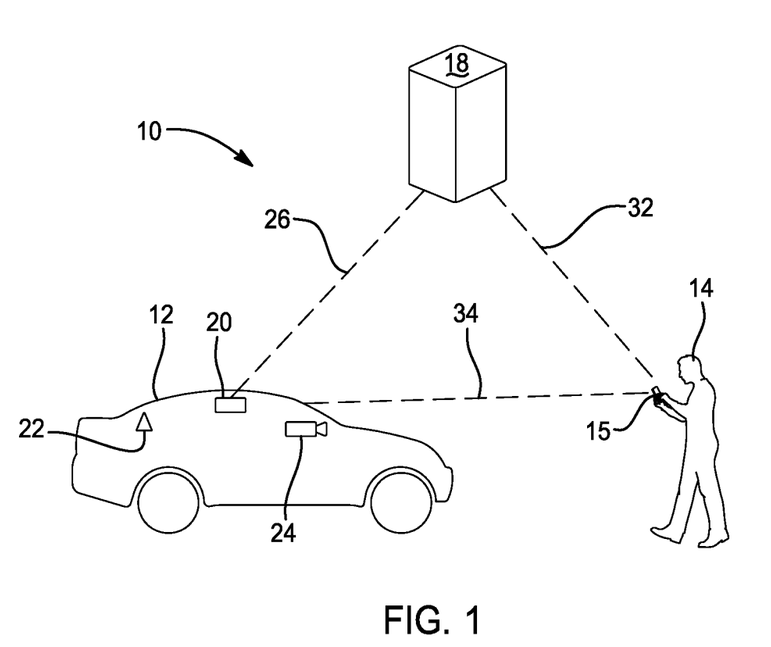
FIG. 1 is a schematic view of a system for unlocking a vehicle in accordance with one embodiment of the present disclosure.
Figure 2:
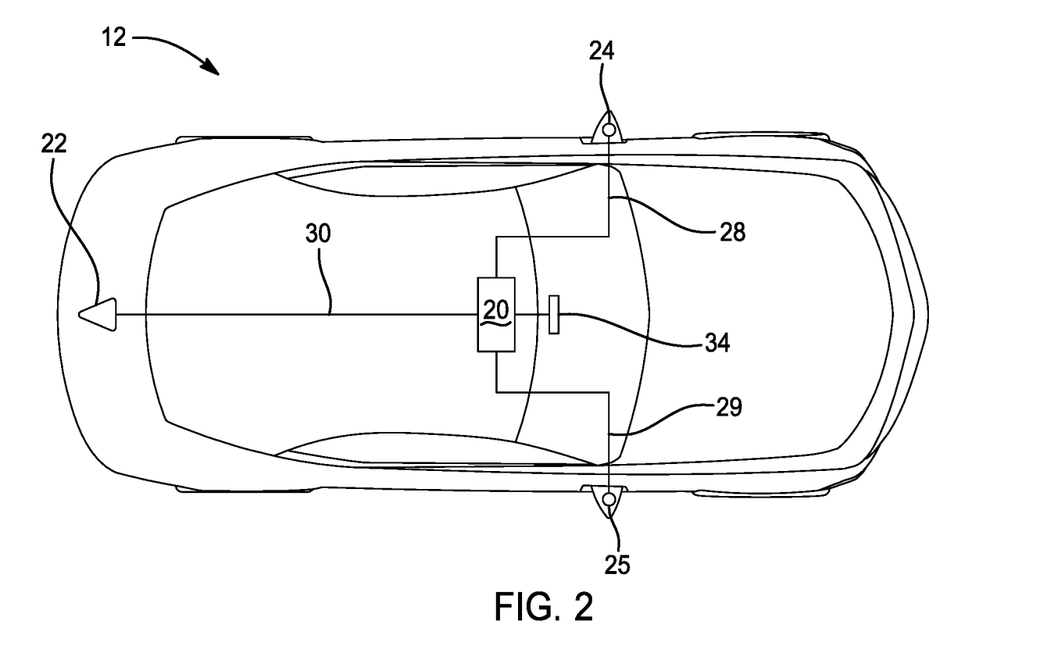
FIG. 2 is a schematic view of a vehicle implementing components of the system of FIG. 1.

FIGS. 1 and 2 illustrate a system 10 for unlocking a vehicle 12 of a user 14 having a handheld device 15 based on visual domain and wireless (e.g., radio frequency) domain technologies is provided. As shown, the system 10 comprises an onboard apparatus 16 of the vehicle 12 and a cloud server 18. Moreover, the onboard apparatus 16 comprises an electronic control unit (ECU) 20 disposed in the vehicle 12, a wireless positioning transmitter 22 disposed in or on the vehicle 12, and external cameras 24, 25 externally disposed on the vehicle 12. Preferably, the cloud server 18 is in communication with the on-board apparatus 16 by way of the ECU 20. It is to be understood that the cloud server 18 may transmit and receive data signals 26 to and from the ECU 20.

As shown, each of the external cameras 24, 25 and the wireless positioning transmitter 22 is in two-way communication with the ECU 20. That is, the external cameras 24, 25 may transmit and receive data signals 28, 29 respectively to and from the ECU 20. As described in greater detail below, the external camera 24 is arranged to detect a facial identity and a visual domain position of the user 14 based on visual domain data of the user 14. Moreover, the wireless positioning transmitter 22 may also transmit and receive data signals 30 respectively to and from the ECU 20 as described below. Further, the cloud server 18 may transmit and receive data signals 32 to and from the handheld device 15. Furthermore, the wireless positioning transmitter 22 may transmit and receive data signals 34 to and from the handheld device 15 as described in greater detail below. It is to be understood that any suitable cloud server, ECU, external camera, and wireless positioning camera may be used to achieve their respective functions as provided herein without departing from the spirit or scope of the present disclosure.

As mentioned, the onboard apparatus 16 comprises the wireless positioning transmitter 22 disposed on the vehicle 12 and in communication with the ECU 20. The wireless positioning transmitter 22 is arranged to receive and transmit radio frequency (RF) domain position data of the vehicle 12 such that an RF domain position of the vehicle 12 may be detected by way of the wireless positioning transmitter 22, the ECU 20, or the cloud server 18 as desired. Moreover, the wireless positioning transmitter 22 is arranged to receive and transmit RF domain position data of the handheld device 15 such that an RF domain position of the user 14 may be detected via the wireless positioning transmitter 22, the ECU 20, or the cloud server 18 as desired.

As shown, the cloud server 18 is disposed remotely from the vehicle 12. The cloud server is in communication with the ECU 20 and the handheld device 15 of the user 14. The handheld device 15 may be a smart phone, e.g., an iphone, or a keyfob.

In one embodiment, when the user 14 is away from the vehicle 12, the system monitors a proximity of the user 14 relative to the vehicle 12. When the proximity of the user 14 relative to the vehicle 12 is within a predetermined distance, the on-board apparatus 16 is activated for use. For example, the ECU 20 is arranged to receive signals from the cloud server 18 to activate the on-board apparatus 16 when the handheld device 15 is within a threshold distance from the vehicle 12. To activate the on-board apparatus 16, the ECU 20 is arranged to monitor a location of the vehicle 12 based on an intentional detection system, e.g., GPS, and send GPS data signals of the vehicle 12 accordingly to the cloud server 18. Additionally, the cloud server 18 is arranged to monitor a position of the handheld device 15 of the user 14 based on an intentional detection system, e.g., GPS. Preferably, the cloud server 18 may receive GPS data signals from the handheld device 15 (e.g., via phone relative positioning and motion/intention detection modules) to monitor the position of the handheld device 15. With both the location of the vehicle 12 and the position of the handheld device 15 based on GPS, the cloud server 18 is arranged to detect whether the handheld device 15 is within the threshold distance from the vehicle 12. When the handheld device 12 is within the threshold distance from the vehicle 12, the cloud server sends a signal to the ECU 20 to activate the on-board apparatus 16 for operation.

Referring to FIGS. 1-2, the cloud server 18 is arranged to compare the visual domain position of the user 14 with the RF domain position of the user 14. That is, the on-board apparatus 16 obtains and sends visual domain position data and RF domain position data of the user 14 to the cloud server 18 for data comparison. Thus, upon activation, the external camera 24 senses the user 14 and captures an image of the user 14 for the visual domain position thereof. In accordance with the image of the user 14, user visual domain data is sent to the ECU 20 which in turn transmits user visual domain data to the cloud server 18. Moreover, upon activation, the wireless positioning transmitter 22 senses the handheld device 15 and receives an RF signal from the handheld device 15 for the RF domain position of the user 14. In accordance with the RF data from the handheld device 15, device RF domain data is sent to the ECU 20 which in turn transmits device RF domain data to the cloud server 18.

With the visual domain data and the RF domain data from the ECU 20, the cloud server 18 is arranged to verify the facial identity of the user 14 based on the visual domain data of the user 14. In one verification example, the cloud server 18 is arranged to assess image data quality of the facial identity of the user 14 based on the visual domain data of the user 14. The cloud server 18 is arranged to determine a confidence threshold based on an image quality of the facial identity of the user 14. If the image quality is relatively low, the confidence threshold may be lowered. Moreover, if the image quality is relatively high, the confidence threshold may be increased. By way of a facial recognition module, the cloud server 18 is arranged to process the visual domain data of the user 14 to define a confidence score of the facial identity of the user 14. By way of an authentication module, the cloud server 18 is arranged to confirm (verify) the facial identity of the user 14 when the confidence score is greater than the confidence threshold.

Upon facial identity verification, the cloud server 18 is arranged to estimate the visual domain position of the user 14 based on visual domain data of the user 14 from the ECU 20. Additionally, the cloud server 18 is arranged to determine an RF domain position of the vehicle 12 based on the RF domain data of the vehicle 12. Furthermore, the cloud server 18 is arranged to determine the RF domain position of the user 14 based on the RF domain data of the handheld device 15.

In this embodiment, the cloud server 18 is arranged to compare a first distance with a second distance. The first distance is a distance between the user 14 and the vehicle 12 based on visual domain data of the user 14. The second distance is a distance between the user 14 and the vehicle 12 based on RF domain data. Furthermore, a vehicle's local coordinate system may be used to describe the relation between the vehicle 12 and the user 14. It is to be understood that the vehicle local coordinate system may be a Cartesian coordinate system, a Spherical coordinate system, or any other suitable coordinate system without departing from the spirit or scope of the present disclosure.

Figure 3:
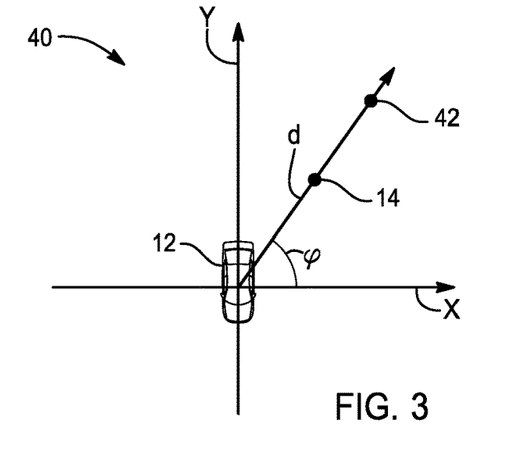
FIG. 3 is a graphical view of a local coordinate system of the vehicle in FIG. 2 for comparing a visual domain position and an RF domain position of the user in accordance with one example.

For example, the cloud server 18 is arranged to compare the visual domain position of the user 14 with the RF domain position of the user 14 by a first equation, $|d_{visual}^{t_i}(X)-d_{RF}^{t_i}(X)|<\varepsilon_d$ and a second equation, $|\varphi_{visual}^{t_i}(X)-\varphi_{RF}^{t_i}(X)|<\varepsilon_\varphi$ relative to a coordinate system 40 shown in FIG. 3.

In this example, the term $d_{visual}^{t_i}(X)$ is a radial distance of the user 14 from the vehicle 12 relative to the coordinate system 40 (FIG. 3) of the vehicle 12 based on visual domain data. In addition, the term $d_{RF}^{t_i}(X)$ is a radial distance of the user 14 from the vehicle 12 based on wireless domain data and relative to the coordinate system 40. Moreover, the term $\varphi_{visual}^{t_i}(X)$ is a first azimuthal angle calculated from visual domain data relative to the coordinate system 40 in FIG. 3. Additionally, the term $\varphi_{RF}^{t_i}(X)$ is a second azimuthal angle calculated from wireless domain data relative to the coordinate system 40. Furthermore, the term $\varepsilon_d$ is a distance consistency threshold to validate the distance consistency of the visual domain data and the RF domain data, and the term $\varepsilon_\theta$ is an angle consistency threshold to validate the angle consistency of the visual domain data and the RF domain data relative to the coordinate system 40 shown in FIG. 3.

Moreover, the cloud server 18 is arranged to validate the user 14 when the first and second equations are true. Furthermore, the cloud server 18 is arranged to unlock the vehicle 12 when the user 14 is validated. For example, the cloud server 18 may send a command signal to the ECU 20 to unlock a door of the vehicle 12.

For safety purposes, the cloud server 18 may be arranged to detect a non-user relative to the user 14 within the threshold distance and pause any steps of the system if the non-user is relatively close in proximity to the user. Such feature may be helpful to avoid potentially unsafe situations by a malicious non-user. Thus, the cloud server may be arranged to check the distance between the user and non-user. Moreover, if the non-user is detected to be within a minimum distance from the user, the cloud server may be arranged to pause any steps of unlocking the vehicle. The cloud server may also be arranged to contact authorities if desired.

For example, the cloud server 18 may be arranged to detect the non-user 42 (FIG. 3) having a non-user device (not shown) based on visual domain data of the non-user 42 and RF domain data of the non-user device to define a visual domain position and an RF domain position of the non-user, respectively. In one example, one of the external cameras 24, 25 may sense the non-user 42 and capture an image of the non-user 42 for the visual domain position thereof. In accordance with the image of the non-user 42, a non-user visual domain data signal is sent to the ECU 20 which in turn transmits non-user visual domain data to the cloud server 18.

Additionally, the wireless positioning transmitter 22 may sense the handheld device of the non-user 42 and may be arranged to receive RF data from the non-user's handheld device (via positioning module or motion/intention detection module) for the RF domain position of the non-user. In accordance with the RF data from the non-user's handheld device, a non-user RF domain data signal is sent to the ECU 20 which in turn transmits non-user RF domain data to the cloud server 18.

In this example, the cloud server 18 is arranged to compare the visual domain position and the RF domain position of the user 14 with the visual domain position and the RF domain position of the non-user 42 by a third equation $|d_{visual}^{t_i}(X)-d_{visual}^{t_i}(Y)|>\vartheta_d$, a fourth equation, $|\varphi_{visual}^{t_i}(X)-\varphi_{visual}^{t_i}(Y)|>\vartheta_\varphi$, a fifth equation $|d_{RF}^{t_i}(X)-d_{RF}^{t_i}(Y)|>\vartheta_d$, and a sixth equation $|\varphi_{RF}^{t_i}(X)-\varphi_{RF}^{t_i}(Y)|>\vartheta_\varphi$.

In this embodiment, $d_{visual}^{t_i}(Y)$ is a radial distance of the non-user 42 to the vehicle 12 relative to the coordinate system (FIG. 3) of the vehicle 12 based on visual domain data, $d_{RF}^{t_i}(Y)$ is a radial distance of the non-user 42 to the vehicle 12 relative to the coordinate system (FIG. 3) of the vehicle 12 based on wireless domain data, $\varphi_{visual}^{t_i}(Y)$ is a third azimuthal angle of the non-user 42 to the vehicle 12 relative to the coordinate system (FIG. 3) based on visual domain data, $\varphi_{RF}^{t_i}(Y)$ is a fourth azimuthal angle of the non-user 42 to the vehicle 12 relative to the coordinate system (FIG. 3) based on wireless domain data, $\vartheta_d$ is an inter-target distance disparity threshold to identify the distance disparity of the user 14 and the non-user 42 around the vehicle 12, and $\vartheta_\varphi$ is an inter-target angle disparity threshold to identify the angle disparity of the user 14 and non-user 42 around the vehicle 12.

Furthermore, the cloud server 18 is arranged to proceed to validating the user 14 when the third, fourth, fifth, and sixth equations are true. However, if the any of the third, fourth, fifth, or sixth equations is not true, then it may be determined that the non-user 42 may be within the minimum distance relative to the user 14. Hence, any steps of unlocking the vehicle 12 may be unsafe or not secure. Therefore, all steps of unlocking the vehicle may be temporarily paused.

In another embodiment, the user's facial identity may be repeatedly verified when the user 14 is in the vehicle 12. Such verification may be helpful for added security and authorization especially in situations where a user may frequently depart a vehicle temporarily. For example, when a vehicle is used in transportation and courier industries, facial identity verification may be desired for added security and authorization of the vehicle.

As an example and shown in FIG. 2, the onboard apparatus 16 of the vehicle 12 further comprises an internal camera 36 disposed in the vehicle 12 and in communication with the ECU 20. Moreover, the internal camera 36 is arranged to detect the facial identity and the visual domain position of the user 14 in the vehicle 12 based on visual domain data. In one example, the internal camera 36 may sense the user 14 and capture an image of the user 14 for the visual domain position thereof when in the vehicle 12. In accordance with the image of the user 14, a user visual domain data signal is sent to the ECU 20 which in turn transmits visual domain data to the cloud server 18. Preferably, the cloud server 18 is arranged to verify the facial identity of the user 14 based on visual domain data of the user 14 when the user 14 is in the vehicle 12.

Upon unlocking the vehicle 12, the cloud server 18 is arranged to perform a sequence of actions within the vehicle 12 based on personalized settings of the user 14 after the vehicle 12 is unlocked. For example, the user may have preset personalized settings saved in the ECU 20 and such personalized settings may be activated within the vehicle 12. Such personalized settings may include but is not limited to temperature control, audio, stereo, seat, steering wheel, and driving mode settings.

For convenience and added security purposes, the system may be arranged to detect and verify a companion-user when in the vehicle. Upon detection and verification, the system 10 may be arranged to perform a sequence of actions with the vehicle 12 based on personalized settings of the companion-user. For example, the companion-user may have preset personalized settings saved in the ECU 20 and such personalized settings may be activated within the vehicle 12. Such personalized settings may include but is not limited to temperature control, audio, stereo, seat, steering wheel, and driving mode settings.

As an example thereof, the internal camera may be arranged to detect a companion-user having a companion-user device based on visual domain data and RF domain data of the companion-user device to define a visual domain position and an RF domain position of the companion-user. In this example, the internal camera is arranged to detect the facial identity and the visual domain position of the companion-user based on visual domain data of the companion-user in the vehicle 12. Additionally, the internal camera may sense the companion-user and capture an image of the companion-user for the visual domain position thereof when in the vehicle 12. In accordance with the image of the companion-user, a companion-user visual domain data signal is sent to the ECU 20 which in turn transmits companion-user visual domain data to the cloud server 18. Preferably, the cloud server 18 is arranged to verify the facial identity of the companion-user based on visual domain data of the companion-user in the vehicle 12.

Upon companion-user verification, the cloud server 18 is arranged to perform a sequence of actions within the vehicle 12 based on personalized settings of the companion-user. As mentioned above, the companion-user may have preset personalized settings saved in the ECU 20 and such personalized settings may be activated within the vehicle 12. Such personalized settings may include but is not limited to temperature control, audio, stereo, seat, steering wheel, and driving mode settings.

It is to be understood that at least one of the cloud server 18 and the on-board apparatus 16, e.g., the ECU 20, may comprise a number of algorithms and modules having algorithms to achieve the tasks provided herein. For example, the cloud server and the on-board apparatus may comprise a user/vehicle registration module to validate users and their vehicles. Moreover, the cloud server and on-board apparatus may comprise a resource discovery module to monitor and record the location of the user's vehicle and handheld device 15. Further, the cloud server and on-board apparatus may comprise an image processing (including face recognition and positioning) module to recognize and position the user based on visual domain data. Moreover, the cloud server and on-board apparatus may comprise relative positioning sensor fusion module to compare visual domain positions with RF domain positions of any of the user, non-user, and companion-user. Additionally, the cloud server and the on-board apparatus may comprise a user identification and personalization module to store user identification and personalized settings thereof.

Moreover, the cloud server and the on-board apparatus may comprise a WiFi/UWB positioning module to detect and send wireless domain data of any of the vehicle, user device, non-user device, and companion-user device. In addition, the cloud server and the on-board apparatus may comprise a quality assessment module to assess the image quality of any of the user, non-user, and companion-user. Further, the cloud server and the on-board apparatus may comprise an authentication module to detect and verify faces of any of the user, non-user, and companion-user based on visual domain data. Furthermore, the cloud server and the on-board apparatus may comprise a face recognition and face positioning module to recognize and position of any of the user, non-user, and companion-user based on visual domain data. Other modules and algorithms may be used without departing from the scope or spirit of the present disclosure.

It is to be understood that the handheld device of the user, non-user, and companion-user may comprise a number of algorithms and modules having algorithms to achieve the tasks provided herein. For example, the handheld device may comprise a vehicle/phone relative positioning module for positioning the vehicle and the handheld device. Moreover, the handheld device may comprise a motion/intention detection module for detecting and sensing motion of the vehicle or device.

Figure 4:
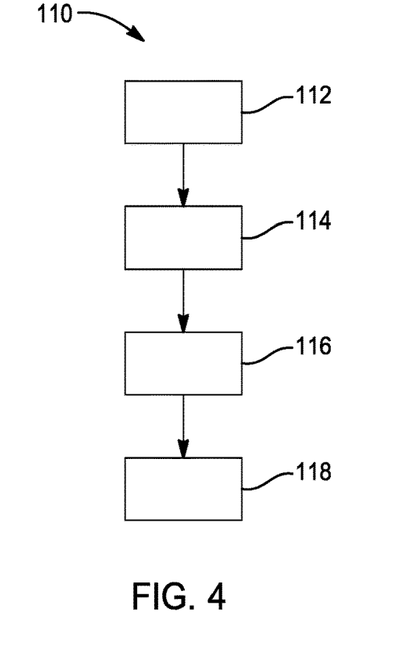
FIG. 4 is a flowchart of a method of unlocking a vehicle with the system of FIG. 1 in accordance with one example of the present disclosure.

FIG. 4 depicts a method 110 of unlocking a vehicle of a user having a handheld device based on visual domain and radio frequency (RF) domain technologies in accordance with one example of the present disclosure. Preferably, the system 10 of FIGS. 1-3 is implemented to achieve the method 110. As shown in FIG. 4 and referring to FIGS. 1-3, the method 110 comprises a step 112 of activating an on-board apparatus 16 of the vehicle 12 when the handheld device 15 of the user 14 is within a threshold distance from the vehicle 12. In this aspect, the method 110 further comprises a step 114 of comparing a visual domain position of the user 14 based on visual domain data with an RF domain position of the user 14 based on RF domain data by a first equation, $|d_{visual}^{t_i}(X) - d_{RF}^{t_i}(X)| < \varepsilon_d$, and a second equation, $|\varphi_{visual}^{t_i}(X) - \varphi_{RF}^{t_i}(X)| < \varepsilon_\varphi$.

In this aspect, $d_{visual}^{t_i}(X)$ is a radial distance of the user 14 from the vehicle 12 relative to a coordinate system 40 of the vehicle 12 based on visual domain data, $d_{RF}^{t_i}(X)$ is a radial distance of the user 14 from the vehicle 12 relative to RF domain data, $\varphi_{visual}^{t_i}(X)$ is a first azimuthal angle calculated from visual domain data, $\varphi_{RF}^{t_i}(X)$ is a second azimuthal angle calculated from wireless domain data, $\varepsilon_d$ is a distance consistency threshold to validate the distance consistency of the visual domain data and the RF domain data, and $\varepsilon_\theta$ is an angle consistency threshold to validate the angle consistency of the visual domain data and the RF domain data.

Moreover, the method 110 further comprises a step 116 of validating the user 14 when the first and second equations are true and a step 118 of unlocking the vehicle 12 after the user 14 is validated.

Figure 5:
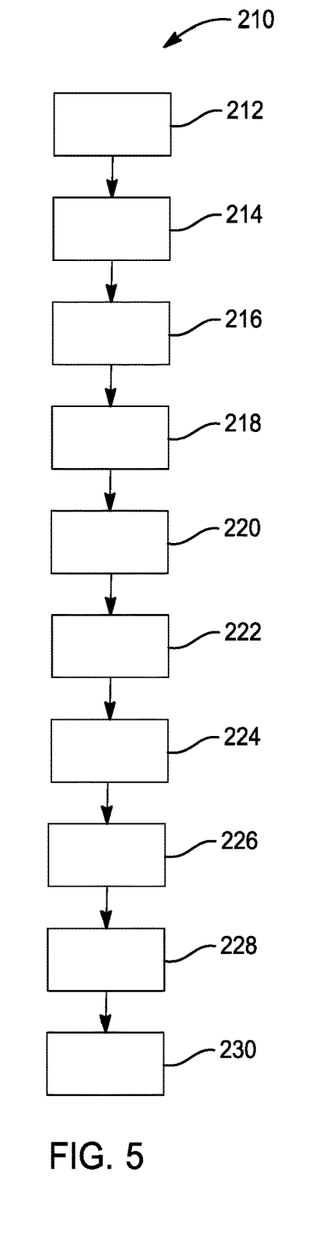
FIG. 5 is a flowchart of a method of unlocking a vehicle with the system of FIG. 1 in accordance with another example.

FIG. 5 depicts a method 210 of unlocking a vehicle 12 of a user 14 having a handheld device 15 based on visual domain and radio frequency (RF) domain technologies in accordance with another example of the present disclosure. Preferably, the system 10 of FIGS. 1-3 is implemented to achieve the method 210. The method 210 comprises a step 212 of monitoring a location of the vehicle 12 and a position of the handheld device 15 of a user 14 based on an intentional detection system and a step 214 of detecting whether the handheld device 15 is within a threshold distance from the vehicle 12. In this aspect, the method 210 further comprises a step 216 of activating an on-board apparatus 16 of the vehicle 12 when the handheld device 15 is within the threshold distance from the vehicle 12 and a step 218 of verifying a facial identity of the user 14 based on visual domain data of the user 14.

In this aspect, the method 210 further comprises a step 220 of estimating a visual domain position of the user 14 based on visual domain data of the user 14, a step 222 of determining an RF domain position of the vehicle 12 based on RF domain data of the vehicle 12, and a step 224 of determining an RF domain position of the user 14 based on RF domain data of the handheld device 15.

Moreover, in this aspect, the method 210 further comprises a step 226 of comparing the visual domain position of the user 14 with the RF domain position of the user 14 by a first equation, $|d_{visual}^{t_i}(X) - d_{RF}^{t_i}(X)| < \varepsilon_d$ and a second equation $|\varphi_{visual}^{t_i}(X) - \varphi_{RF}^{t_i}(X)| < \varepsilon_\varphi$. In this aspect, $d_{visual}^{t_i}(X)$ is a radial distance of the user 14 from the vehicle 12 relative to a coordinate system 40 of the vehicle 12 based on visual domain data, $d_{RF}^{t_i}(X)$ is a radial distance of the user 14 from the vehicle 12 relative to a wireless domain data, $\varphi_{visual}^{t_i}(X)$ is a first azimuthal angle calculated from visual domain data, $\varphi_{RF}^{t_i}(X)$ is second azimuthal angles calculated from wireless domain data, $\varepsilon_d$ is a distance consistency threshold to help validate the distance consistency of the visual domain data and the RF domain data, and $\varepsilon_\theta$ is an angle consistency threshold to help validate the angle consistency of the visual domain data and the RF domain data.

Furthermore, the method 210 further comprises a step 228 of validating the user 14 when the first and second comparisons are true and a step 230 of unlocking the vehicle 12 after the user 14 is validated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of unlocking a vehicle of a user having a handheld device based on visual domain and radio frequency (RF) domain technologies, the method comprising:

activating an on-board apparatus of the vehicle when the handheld device of the user is within a threshold distance from the vehicle;

comparing a visual domain position of the user based on visual domain data with an RF domain position of the user based on RF domain data by a first equation, $$|d_{visual}^{t_i}(X) - d_{RF}^{t_i}(X)| < \varepsilon_d$$

and a second equation, $$|\varphi_{visual}^{t_i}(X)-\varphi_{RF}^{t_i}(X)|<\varepsilon_\varphi,$$

where $d_{visual}^{t_i}(X)$ is a radial distance of the user from the vehicle relative to a coordinate system of the vehicle based on visual domain data, $d_{RF}^{t_i}(X)$ is a radial distance of the user from the vehicle relative to RF domain data, $\varphi_{visual}^{t_i}(X)$ is a first azimuthal angle calculated from visual domain data, $\varphi_{RF}^{t_i}(X)$ is a second azimuthal angle calculated from wireless domain data, $\varepsilon_d$ is a distance consistency threshold to validate the distance consistency of the visual domain data and the RF domain data, and $\varepsilon_\theta$ is an angle consistency threshold to validate the angle consistency of the visual domain data and the RF domain data;

validating the user when the first and second equations are true; and unlocking the vehicle after the user is validated.

2. The method of claim 1 wherein the step of activating comprises:

monitoring a location of the vehicle and a position of a handheld device of a user based on an intentional detection module; and detecting whether the handheld device is within the threshold distance from the vehicle.

3. The method of claim 1 wherein the step of comparing comprises:

verifying a facial identity of the user based on visual domain data of the user;

estimating the visual domain position of the user based on visual domain data of the user;

determining an RF domain position of the vehicle based on RF domain data of the vehicle; and determining the RF domain position of the user based on RF domain data of the handheld device.

4. The method of claim 3 wherein the step of comparing further comprises:

detecting a non-user having a non-user device based on visual domain data of the non-user and RF domain data of the non-user device to define a visual domain position and an RF domain position of the non-user;

comparing the visual domain position and the RF domain position of the user with the visual domain position and the RF domain position of the non-user by a third equation, $$|d_{visual}^{t_i}(X)-d_{Visual}^{t_i}(Y)|>\vartheta_d$$

a fourth equation, $$\varphi_{visual}^{t_i}(X)-\varphi_{Visual}^{t_i}(Y)|>\vartheta_\varphi$$

a fifth equation, $$|d_{RF}^{t_i}(X)-d_{RF}^{t_i}(Y)|>\vartheta_d$$

a sixth equation, $$|\varphi_{RF}^{t_i}(X)-\varphi_{RF}^{t_i}(Y)|>\vartheta_\varphi$$

where $d_{Visual}^{t_i}(Y)$ is a radial distance of the non-user to the vehicle relative to the coordinate system based on visual domain data, $d_{RF}^{t_i}(Y)$ is a radial distance of the non-user to the vehicle relative to the coordinate system based on wireless domain data, $\varphi_{Visual}^{t_i}(Y)$ is an azimuthal angle of the non-user to the vehicle relative to the coordinate system based on visual domain data, $\varphi_{RF}^{t_i}(Y)$ is an azimuthal angle of the non-user to the vehicle relative to the coordinate system based on wireless domain data, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle; and proceeding to the step of validating the user when the third, fourth, fifth, and sixth equations are true.

5. The method of claim 1 further comprising performing a sequence of actions within the vehicle based on personalized settings of the user after unlocking the vehicle.

6. The method of claim 1 further comprising;

detecting the facial identity and the visual domain position of the user based on visual domain data of the user when the user is in the vehicle; and verifying the facial identity of the user based on visual domain data of the user when the user is in the vehicle.

7. The method of claim 1 further comprising:

detecting a companion-user having a companion-user device based on visual domain data of the companion-user and RF domain data of the companion-user device to define a visual domain position and an RF domain position of the companion-user; and performing a sequence of actions within the vehicle based on personalized settings of the companion-user after unlocking the vehicle.

8. The method of claim 3 wherein verifying the facial identity of the user comprises:

assessing image data quality of the facial identity of the user based on visual domain data of the user;

determining a confidence threshold based on the image quality of the facial identity of the user;

processing the visual domain data of the user with a facial recognition module to define a confidence score of the facial identity of the user; and confirming the facial identity of the user with an authentication module when the confidence score is greater than the confidence threshold.

9. A system for unlocking a vehicle of a user having a handheld device based on visual domain and radio frequency (RF) domain technologies, the system comprising:

an onboard apparatus of the vehicle, the onboard apparatus comprising:

an electronic control unit (ECU) disposed in the vehicle;

an external camera disposed on the vehicle and in communication with the ECU, the external camera arranged to detect a facial identity and a visual domain position of the user based on visual domain data of the user; and a wireless positioning transmitter disposed on the vehicle and in communication with the ECU, the wireless positioning transmitter arranged to detect an RF domain position of the vehicle based on RF domain data of the vehicle, the wireless positioning transmitter arranged to detect an RF domain position of the user based on RF domain data of the handheld device; and a cloud server remote from the vehicle and in communication with the ECU and the handheld device, the cloud server arranged to compare the visual domain position of the user with the RF domain position of the user by a first equation, $$|d_{visual}^{t_i}(X)-d_{RF}^{t_i}(X)|<\varepsilon_d$$

and a second equation, $|\varphi_{visual}^{t_i}(X) - \varphi_{RF}^{t_i}(X)| < \varepsilon_\varphi$ where $d_{visual}^{t_i}(X)$ is a radial distance of the user from the vehicle relative to a coordinate system of the vehicle based on visual domain data, $d_{RF}^{t_i}(X)$ is a radial distance of the user from the vehicle based on wireless domain data, $\varphi_{visual}^{t_i}(X)$ is a first azimuthal angle calculated from visual domain data, $\varphi_{RF}^{t_i}(X)$ is second azimuthal angles calculated from wireless domain data, $\varepsilon_d$ is a distance consistency threshold to validate the distance consistency of the visual domain data and the RF domain data, and $\varepsilon_\theta$ is an angle consistency threshold to validate the angle consistency of the visual domain data and the RF domain data, wherein the cloud server is arranged to validate the user when the first and second equations are true, wherein the cloud server is arrange to unlock the vehicle when the user is validated, wherein the ECU is arranged to activate the external camera and the wireless positioning transmitter of the vehicle when the handheld device of the user is within a threshold distance from the vehicle.

10. The system of claim 9 wherein the ECU is arranged to monitor a location of the vehicle, wherein the cloud server is arranged to monitor a position of a handheld device of a user based on an intentional detection system, and wherein the cloud server is arranged to detect whether the handheld device is within the threshold distance from the vehicle.

11. The system of claim 10 wherein the cloud server is arranged to verify the facial identity of the user based on visual domain data of the user, wherein the cloud server is arranged to estimate the visual domain position of the user based on visual domain data of the user, wherein the cloud server is arranged to determine an RF domain position of the vehicle based on RF domain data of the vehicle, and wherein the cloud server is arranged to determine the RF domain position of the user based on RF domain data of the handheld device.

12. The system of claim 11 wherein the cloud server is arranged to detecting a non-user with a non-user device based on visual domain data of the non-user and RF domain data of the non-user device to define a visual domain position and an RF domain position of the non-user, wherein the cloud server is arranged to compare the visual domain position and the RF domain position of the user with the visual domain position and the RF domain position of the non-user by a third equation, $|d_{visual}^{t_i}(X) - d_{Visual}^{t_i}(Y)| > \vartheta_d$ a fourth equation, $\varphi_{visual}^{t_i}(X) - \varphi_{Visual}^{t_i}(Y)| > \vartheta_\varphi$ a fifth equation, $|d_{RF}^{t_i}(X) - d_{RF}^{t_i}(Y)| > \vartheta_d$ a sixth equation, $|\varphi_{RF}^{t_i}(X) - \varphi_{RF}^{t_i}(Y)| > \vartheta_\varphi$ where $d_{Visual}^{t_i}(X)$ is a radial distance of the user to the vehicle based on the coordinate system of the vehicle based visual domain data, $d_{Visual}^{t_i}(Y)$ is radial distance of the non-user based on the coordinate system, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle, wherein the cloud server is arranged to proceed to validating the user when the third, fourth, fifth, and sixth equations are true.

13. The system of claim 9 wherein the onboard apparatus of the vehicle further comprises:

an internal camera disposed in the vehicle and in communication with the ECU, the internal camera arranged to detect the facial identity and the visual domain position of the user based on visual domain data of the user when the user is in the vehicle, wherein the cloud server is arranged to verify the facial identity of the user based on visual domain data of the user when the user is in the vehicle.

14. The system of claim 9 wherein the cloud server is arrange to perform a sequence of actions within the vehicle based on personalized settings of the user after the vehicle is unlocked.

15. The system of claim 9 the onboard apparatus further comprises:

an internal camera disposed in the vehicle and in communication with the ECU, the internal camera arranged to detect a companion-user having a companion-user device based on visual domain data of the companion-user and RF domain data of the companion-user device to define a visual domain position and an RF domain position of the companion-user; and wherein the cloud server is arranged to perform a sequence of actions within the vehicle based on personalized settings of the companion-user after unlocking the vehicle.

16. A method of unlocking a vehicle of a user having a handheld device based on visual domain and radio frequency (RF) domain technologies, the method comprising:

monitoring a location of the vehicle and a position of the handheld device of a user based on an intentional detection system;

detecting whether the handheld device is within a threshold distance from the vehicle;

activating an on-board apparatus of the vehicle when the handheld device is within the threshold distance from the vehicle;

verifying a facial identity of the user based on visual domain data of the user;

estimating a visual domain position of the user based on visual domain data of the user;

determining an RF domain position of the vehicle based on RF domain data of the vehicle;

determining an RF domain position of the user based on RF domain data of the handheld device;

comparing the visual domain position of the user with the RF domain position of the user by a first comparison, $|d_{visual}^{t_i}(X) - d_{RF}^{t_i}(X)| < \varepsilon_d$ and a second comparison, $|\varphi_{visual}^{t_i}(X) - \varphi_{RF}^{t_i}(X)| < \varepsilon_\varphi$ where $d_{visual}^{t_i}(X)$ is a radial distance of the user from the vehicle relative to a coordinate system of the vehicle based on visual domain data, $d_{RF}^{t_i}(X)$ is a radial distance of the user from the vehicle relative to a wireless domain data, $\varphi_{visual}^{t_i}(X)$ is a first azimuthal angle calculated from visual domain data, $\varphi_{RF}^{t_i}(X)$ is second azimuthal angles calculated from wireless domain data, $\varepsilon_d$ is a distance consistency threshold to help validate the distance consistency of the visual domain data and the RF domain data, and $\varepsilon_\theta$ is an angle consistency threshold to help validate the angle consistency of the visual domain data and the RF domain data;

validating the user when the first and second comparisons are true; and unlocking the vehicle after the user is validated.

17. The method of claim 16 wherein the step of comparing further comprises:

detecting a non-user having a non-user device based on visual domain data of the non-user and RF domain data of the non-user device to define a visual domain position and an RF domain position of the non-user;

comparing the visual domain position and the RF domain position of the user with the visual domain position and the RF domain position of the non-user by a third equation, $$|d_{visual}^{ti}(X) - d_{visual}^{ti}(Y)| > \vartheta_d$$

a fourth equation, $$|\varphi_{visual}^{ti}(X) - \varphi_{visual}^{ti}(Y)| > \vartheta_\varphi$$

a fifth equation, $$|d_{RF}^{ti}(X) - d_{RF}^{ti}(Y)| > \vartheta_d$$

a sixth equation, $$|\varphi_{RF}^{ti}(X) - \varphi_{RF}^{ti}(Y)| > \vartheta_\varphi$$

where $d_{visual}^{ti}(X)$ is a radial distance of the user to the vehicle based on the coordinate system of the vehicle based visual domain data, $d_{visual}^{ti}(Y)$ is radial distance of the non-user based on the coordinate system, $\vartheta_d$ is an inter-target distance disparity threshold to identify the distance disparity of the user and the non-user around the vehicle, $\vartheta_\varphi$ is an inter-target angle disparity threshold to identify the angle disparity of the user and non-user around the vehicle; and proceeding to the step of validating the user when the third, fourth, fifth, and sixth equations are true.

18. The method of claim 16 further including performing a sequence of actions within the vehicle based on personalized settings of the user after unlocking the vehicle.

19. The method of claim 16 further comprising:

detecting a companion-user having a companion-user device based on visual domain data of the companion-user and RF domain data of the companion-user device to define a visual domain position and an RF domain position of the companion-user; and performing a sequence of actions within the vehicle based on personalized settings of the companion-user after unlocking the vehicle.

20. The method of claim 16 wherein verifying the facial identity of the user comprises:

assessing image data quality of the facial identity of the user based on visual domain data of the user;

determining a confidence threshold based on the image quality of the facial identity of the user;

processing the visual domain data of the user with a facial recognition module to define a confidence score of the facial identity of the user; and confirming the facial identity of the user with an authentication module when the confidence score is greater than the confidence threshold.

* * * * *